US008776153B2

(12) United States Patent
Ansari et al.

(10) Patent No.: US 8,776,153 B2
(45) Date of Patent: Jul. 8, 2014

(54) METHOD AND SYSTEM FOR TRANSFERRING CONTENT TO A NETWORKED UNIT

(75) Inventors: Ahmad Ansari, Austin, TX (US); John Robert Erickson, Austin, TX (US); Pierre Costa, Austin, TX (US); Brad Allen Medford, Austin, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1339 days.

(21) Appl. No.: 09/842,363

(22) Filed: Apr. 25, 2001

(65) Prior Publication Data

US 2002/0170063 A1      Nov. 14, 2002

(51) Int. Cl.
*H04N 7/173*       (2011.01)
*H04N 21/2343*   (2011.01)
*H04N 21/238*     (2011.01)
*H04N 21/63*       (2011.01)
H04N 21/262      (2011.01)

(52) U.S. Cl.
CPC ..... *H04N 21/234327* (2013.01); *H04N 21/238* (2013.01); *H04N 21/631* (2013.01); *H04N 21/262* (2013.01)
USPC .......................................................... 725/95

(58) Field of Classification Search
CPC ................ H04N 21/234327; H04N 21/23655; H04N 21/238
USPC ........... 725/90, 94, 95, 93, 100; 709/232, 235
See application file for complete search history.

(56) References Cited

U.S. PATENT DOCUMENTS

| | | | |
|---|---|---|---|
| 5,341,474 A | 8/1994 | Gelman et al. | |
| 5,371,532 A | 12/1994 | Gelman et al. | |
| 5,410,343 A * | 4/1995 | Coddington et al. | ............ 725/99 |
| 5,414,469 A * | 5/1995 | Gonzales et al. | ........ 375/240.18 |
| 5,508,732 A | 4/1996 | Bottomley et al. | |
| 5,594,491 A | 1/1997 | Hodge et al. | |
| 5,619,249 A | 4/1997 | Billock et al. | |

(Continued)

FOREIGN PATENT DOCUMENTS

EP     1 049 305 A     11/2000

OTHER PUBLICATIONS

Ortega, "Optimization Techniques for Adaptive Quantization of Image and Video Under Delay Constraints", 1994.*

(Continued)

*Primary Examiner* — Pankaj Kumar
*Assistant Examiner* — Usha Raman
(74) *Attorney, Agent, or Firm* — G. Michael Roebuck

(57) ABSTRACT

A system for transporting content to subscriber premises includes a centralized content repository, a subscriber unit, and a network connecting the subscriber unit and repository. The content can be video, image, or other files and the network can include a digital subscriber line (DSL) link. The repository stores higher quality parts of decomposed content files. The subscriber unit locally stores lower quality parts of the content files corresponding to the higher quality parts in the repository. The lower quality parts can be downloaded to the subscriber unit during off-peak hours. During operation, a subscriber selects a locally stored file. In response to the selection, the repository downloads at least one of the higher quality parts corresponding to the selected file to be combined with one of the lower quality parts stored by the subscriber unit for real-time presentation of the content.

9 Claims, 11 Drawing Sheets

(56) References Cited

U.S. PATENT DOCUMENTS

| | | | |
|---|---|---|---|
| 5,701,582 A * | 12/1997 | DeBey | 725/103 |
| 5,742,892 A | 4/1998 | Chaddha | |
| 5,751,338 A | 5/1998 | Ludwig, Jr. | |
| 5,764,639 A | 6/1998 | Staples et al. | |
| 5,790,935 A | 8/1998 | Payton | |
| 5,793,413 A | 8/1998 | Hylton et al. | |
| 5,826,166 A | 10/1998 | Brooks et al. | |
| 5,828,370 A | 10/1998 | Moeller et al. | |
| 5,832,300 A * | 11/1998 | Lowthert | 710/33 |
| 5,835,843 A | 11/1998 | Haddad | |
| 5,889,845 A | 3/1999 | Staples et al. | |
| 5,892,535 A | 4/1999 | Allen et al. | |
| 5,930,526 A | 7/1999 | Iverson | |
| 5,940,117 A * | 8/1999 | Hassan et al. | 725/115 |
| 5,963,202 A | 10/1999 | Polish | |
| 5,973,684 A | 10/1999 | Brooks et al. | |
| 5,974,376 A * | 10/1999 | Hassan et al. | 704/220 |
| 5,990,927 A | 11/1999 | Hendricks et al. | |
| 5,991,306 A | 11/1999 | Burns et al. | |
| 6,049,823 A | 4/2000 | Hwang | |
| 6,072,982 A | 6/2000 | Haddad | |
| 6,078,328 A | 6/2000 | Schumann et al. | |
| 6,081,291 A | 6/2000 | Ludwig, Jr. | |
| 6,151,632 A | 11/2000 | Chaddha et al. | |
| 6,154,465 A | 11/2000 | Pickett | |
| 6,154,771 A | 11/2000 | Rangan et al. | |
| 6,181,867 B1 | 1/2001 | Kenner et al. | |
| 6,366,888 B1 * | 4/2002 | Kroon et al. | 704/500 |
| 6,392,705 B1 * | 5/2002 | Chaddha | 348/388.1 |
| 6,496,980 B1 * | 12/2002 | Tillman et al. | 725/90 |
| 6,510,177 B1 * | 1/2003 | De Bonet et al. | 375/240.16 |
| 6,728,775 B1 * | 4/2004 | Chaddha | 709/231 |
| 6,744,891 B1 * | 6/2004 | Allen | 380/231 |
| 7,020,195 B1 * | 3/2006 | McMahon | 375/240.11 |
| 2002/0078465 A1 * | 6/2002 | Stahl et al. | 725/106 |
| 2002/0116473 A1 * | 8/2002 | Gemmell | 709/219 |
| 2002/0126759 A1 * | 9/2002 | Peng et al. | 375/240.16 |
| 2002/0144276 A1 * | 10/2002 | Radford et al. | 725/87 |
| 2003/0002579 A1 * | 1/2003 | Radha et al. | 375/240.1 |
| 2004/0049793 A1 * | 3/2004 | Chou | 725/87 |
| 2005/0190834 A1 * | 9/2005 | Wu et al. | 375/240.1 |

OTHER PUBLICATIONS

Microsoft Press Computer Dictionary, 3$^{rd}$ edition, 1997, p. 160.*

Microsoft Press Computer Dictionary, 4$^{th}$ edition, 1999, p. 424-425.*

Maxwell, "Asymmetric Digital Subscriber Line: Interim Technology for the Next Forty Years", IEEE Communications Magazine, Oct. 1996, pp. 100-106.*

Fox, Armando, et al., "Adapting to Network and Client Variability Via On-Demand Dynamic Distillation," ACM Sigplan Notices, Association for Computing Machinery, New York, vol. 31, No. 9, Sep. 1, 1996, pp. 160-170.

Fox, Armando, et al., "Reducing WWW Latency and Bandwidth Requirements by Real-Time Distillation," Computer Networks and ISDN Systems, North Holland Publishing, Amsterdam, NL, May 1996, pp. 1445-1456.

European Search Report, dated Jun. 30, 2005, for corresponding European Patent Application No. 02713615.9.

* cited by examiner

ΔQj: is the ΔQ for frame j
LQj: is the LQ for frame j

100

110

METHOD AND SYSTEM FOR TRANSFERRING CONTENT TO A NETWORKED UNIT

TECHNICAL FIELD OF THE INVENTION

The present invention generally relates to networked information distribution systems, and in particular, to a method and system for distributing digitized content, such as images, videos, or other files, to end users for real-time presentation.

BACKGROUND OF THE INVENTION

Many existing communication networks do not provide sufficient bandwidth to support real-time or near real-time presentation of content, such as videos, images or other large media files. The telephone network has been suggested as a means for transporting real-time content. However, systems using the public switched telephone network (PSTN) are often bandwidth limited, providing low quality presentation and services for content such as real-time video.

U.S. Pat. No. 5,410,343, assigned to Bell Atlantic Network Services, Inc., discloses a video-on-demand (VOD) system which relies upon telephone lines for distribution. Specifically, the system disclosed by the '343 patent uses asymmetric digital subscriber line (ADSL) channels, together with the public switched telephone network, for delivery of video program material. Generally, ADSL channels are bidirectional digital links having a high bandwidth downstream link and a low bandwidth upstream link. The advantage of ADSL is that higher bandwidth signals can be transmitted on ordinary telephone lines to end-user premises and additional cable or wiring is not necessary.

Although the system described in the '343 patent represents a significant improvement in the distribution of video programs, the system itself does not have sufficient downstream bandwidth to support high-quality VOD services, similar to those provided by digital broadcast service (DBS) providers. The downstream ADSL channel described in the '343 patent has a bandwidth of 1.544 Mbps, whereas contemporary digital cable service providers offer VOD services at bit rates ranging between 3-6 Mbps. The relatively limited bandwidth of the ADSL system does not permit real-time content at as high of quality as the digital cable and satellite broadcast systems.

U.S. Pat. No. 5,790,935, assigned to Hughes Aircraft Company, discloses a satellite-based digital broadcast system that provides virtual VOD services to subscribers. To reduce peak bandwidth demand, the system described in the '935 patent selectively downloads and caches digital files, such as videos, to subscriber units during off-peak hours. The disclosed system potentially improves the responsiveness of on-demand services by making some content locally available at subscriber units, without the need to access network resources. However, the '935 system requires content files to be stored in their entirety at the subscriber units. For large content files, such as videos, this requires larger storage devices in the subscriber units, and thus, increases the cost of subscriber units. Moreover, the '935 system does not utilize pre-existing network infrastructure, such as the PSTN, and instead relies on a wireless satellite communication network dedicated to video broadcast.

Accordingly, there is a need for an improved transfer system and method that permits the transport of real-time content over pre-existing networks, such as the PSTN.

DETAILED DESCRIPTION OF THE PRESENTLY PREFERRED EMBODIMENTS

It is an advantage of the present invention to provide an improved system and method for distributing content over a network to end users. According to one embodiment of the invention, content files are separated into portions at a content repository. Each of the files can be separated as a function of a compression algorithm. At least one of the portions of a file is then downloaded to a user terminal for storage therein. When the content is selected for presentation at the user terminal, one or more other portions of the file are then streamed in real-time to the user terminal for recombination with the locally stored portion. The recombined content is then presented to the end user.

The present invention is applicable in many networked systems where bandwidth limitations negatively impact the quality of services provided to users. For example, the invention can be employed to transport content over the Internet, private intranets, the PSTN, wireless telecommunication networks, and the like.

In particular, the invention can significantly improve services requiring the transport of video over ADSL networks. It is difficult to offer a video-on-demand (VOD) service at high quality over ADSL networks having an industry standard downstream bandwidth of 1.544 Mbps. Because of the bandwidth limitations of standard ADSL networks, real-time video quality is typically less than the quality provided by satellite-based digital broadcast systems (DBSs) and cable operators. Currently, DBS providers and digital cable providers offer high quality VOD services at bit rates ranging between 3-6 Mbps. By employing the present invention, service providers could offer higher quality VOD services over ADSL networks at 1.544 Mbps.

Figure 1:
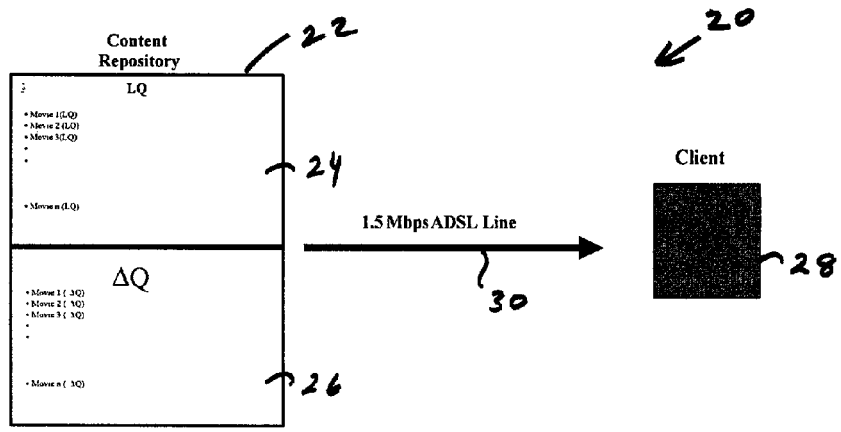
FIG. 1 is a block diagram illustrating a content transfer scheme in accordance with the present invention.

Turning now to the drawings, and in particular FIG. 1, there is illustrated a block diagram of an exemplary content transfer system 20 in accordance with the present invention. Within the system 20, a content repository 22 stores low quality (LQ) and high quality (ΔQ) portions 24-26 of content files. The portions 24-26 are transferable to a client 28 over a network 30, such as an asymmetrical digital subscriber line (ADSL) network.

The content can be any type of information that can be represented in a computer-usable format and transported over a communications network, such as video, image, audio, data or the like. Preferably, the content includes digitized video files representing movies. In accordance with the invention, content files are decomposed into LQ parts 24 and ΔQ parts 26 using a compression technique such as wavelets, sub-band coding, discrete cosine transform (DCT), vector quantization (VQ), or other progressive compression methods.

The system 20 can use partial, pyramid progressive compression techniques to provide VOD services. In progressive compression techniques, compressed information is transmitted in a progressive manner, allowing the receiver side (i.e., client 28) to reconstruct a lower quality version of the image first, and then as it receives more information from the transmit side, the quality is enhanced progressively.

The repository 22 downloads LQ or ΔQ portions of one or more of content files for local storage at the client 28, prior to viewing by the end user. In response to user selections made at the client 28, the remaining part(s) of the content files can be sent in real-time from the repository 24 to the client 28. The advantage of this method over downloading entire files into the client 28 is that a greater number of files can be made available to the client 28 without increasing the storage size in the client 28, thus offering a larger selection of content at a potentially higher quality. Another benefit is related to network congestion. In case of network congestion where a real-time ΔQ download is disrupted or unavailable, the LQ part of the content is available to the client and the content file can be presented at a reduced quality level.

In terms of implementation, the system 20 does not require expensive client and codec design. For video content, the client 28 is able to recompose each video frame from LQ and ΔQ and then perform the task of decompressing the video frames. Currently, many commercially-available digital set-top boxes are capable of decompressing DCT-based compressed video frames.

Figure 2:
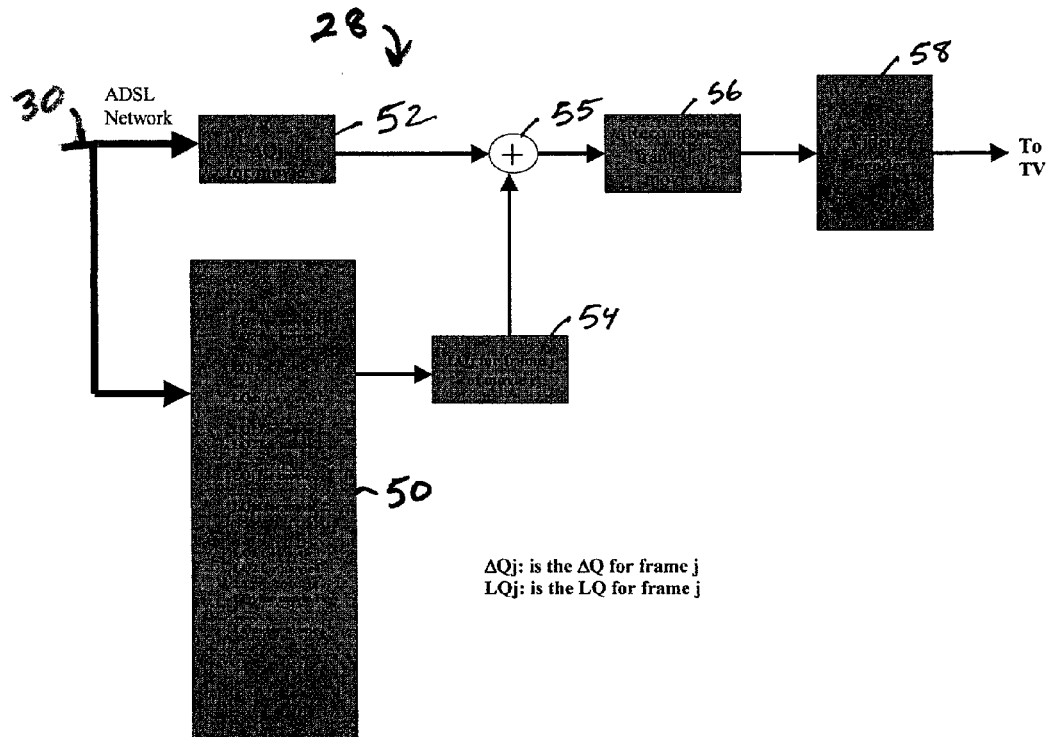
FIG. 2 is a block diagram illustrating details of the client shown in FIG. 1.

FIG. 2 is a block diagram illustrating details of the client 28 shown in FIG. 1. The client 28 can be a set-top box, personal computer, a wireless digital device, such as a personal digital assistant, or any other suitable computing device for performing the client functions disclosed herein. In the exemplary architecture shown, the client 28 includes a storage device 50, a ΔQ buffer 52, an LQ buffer 54, a re-composition device 55, a frame buffer 56 and a video decoder 58.

In operation for viewing digitized movie videos, the LQ parts of n movies are downloaded to the client's storage device 50 using the ADSL network 30. The LQ parts can be downloaded during off-peak hours. The number n depends on the capacity of the storage device 50 in the client 28. When a user selects to view the movie "i", where i is a number between 1 and n, the client 28 sends a request to the repository 22 and asks for the ΔQ information corresponding to the movie "i". The client 28 starts receiving the ΔQ information in real-time and after recomposing the frames, it decompresses the video and sends it to a TV monitor for viewing.

The movie is recomposed frame by frame. To accomplish this, each digitized ΔQ frame j received in real-time is temporarily stored in the buffer 52, where j is a number. The corresponding jth LQ frame is retrieved from the storage device 50 and held in buffer 54. The buffered frames are then recomposed by the re-composition device 55, which in turn stores the recomposed frame in the buffer 56. Recomposed frames are then provided to the video decoder 58, which outputs the decoded video for presentation by a suitable display device, such as a computer or TV monitor.

The buffers 52-56 and storage device 50 can be any suitable memory devices for storing digitized information. The re-composition device can be implemented using a programmable processor, such as a digital signal processor (DSP) or other microprocessor, that executes software code for recombining the LQ and ΔQ frames in the manner described herein. Alternatively, the re-composition device 55, buffers 52-56 and storage device 50, can be implemented using one or more application specific integrated circuits (ASICs), or any suitable combination of standard hardware components, ASICs, and programmable devices.

The video decoder 58 can be a commercially-available video codec.

Figure 3:
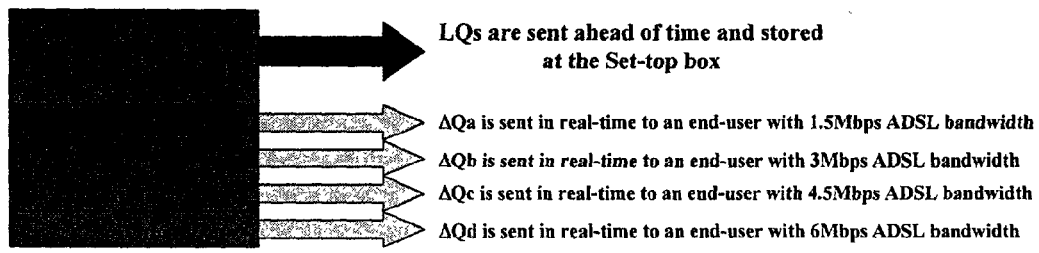
FIG. 3 is a conceptual diagram illustrating one approach to decomposing content.

FIG. 3 is a conceptual diagram illustrating one approach to decomposing content. As mentioned above, each content file is compressed and divided into a LQ and ΔQ. The LQ part of the compressed content corresponds to the basic core of the content. Decompressing and decoding LQ reproduces a lower quality version of the content. When adding ΔQ to LQ and decompressing and decoding the content, the quality is improved significantly.

Because in some network systems, such as ADSL networks, the bandwidth available to end-users varies, depending on factors such as the end-users' distance from the central office, the approach shown in FIG. 3 consists of storing a single LQ for each content file and different ΔQs for the same LQ in the content repository 22. At the content creation phase, the different ΔQs are optimized for different bandwidths. Each combination of LQ and $\Delta Q_i$ produces a different content quality, where i=(a,b,c,d). FIG. 3 shows customers with different bandwidths being offered the same content at different bit rates. This approach enables a service provider to provide different levels of service.

For the example file 100 shown in FIG. 3, a single LQ portion is provided by the repository, along with four ΔQ portions: $\Delta Q_a$, $\Delta Q_b$, $\Delta Q_c$, and $\Delta Q_d$. Each of the ΔQ portions can be independently combined with the LQ portion to produce a final content file having a different quality level to satisfy particular bandwidth. In the example shown, $\Delta Q_a$ can be combined with LQ for use with a 1.5 Mbps network bandwidth, $\Delta Q_b$ can be combined with LQ for use with a 3 Mbps bandwidth, $\Delta Q_c$ can be combined with LQ for a 4.5 Mbps bandwidth, and $\Delta Q_d$ can be combined for use with a 6 Mbps bandwidth.

The following description provides examples of how two different end-users with two different bandwidths are provided a VOD service with the approach of FIG. 3.

For an end user with a bandwidth of 1.5 Mbps, the end-user selects a content file from a list of available files for which the LQs are already downloaded to the client 28. After the selection is made the repository 22 is alerted of the end-user's choice and a server selects the $\Delta Q_a$ that is optimized for users with a bandwidth of 1.5 Mbps and starts streaming the $\Delta Q_a$ content to the client 28. The client 28 receives the $\Delta Q_a$ information and combines it with the LQ information that is already stored in the client and then decodes the re-combined content and displays it on a display device.

For an end user with a bandwidth of 3 Mbps, after the content selection process by the end user, the repository server selects $\Delta Q_b$ that is optimized for the 3 Mbps network bandwidth and starts streaming the $\Delta Q_b$ content to the client 28. The client 28 receives the $\Delta Q_b$ information and combines it with the LQ information that is already stored in the client and then decodes the re-combined content and displays it on a display device.

Figure 5:
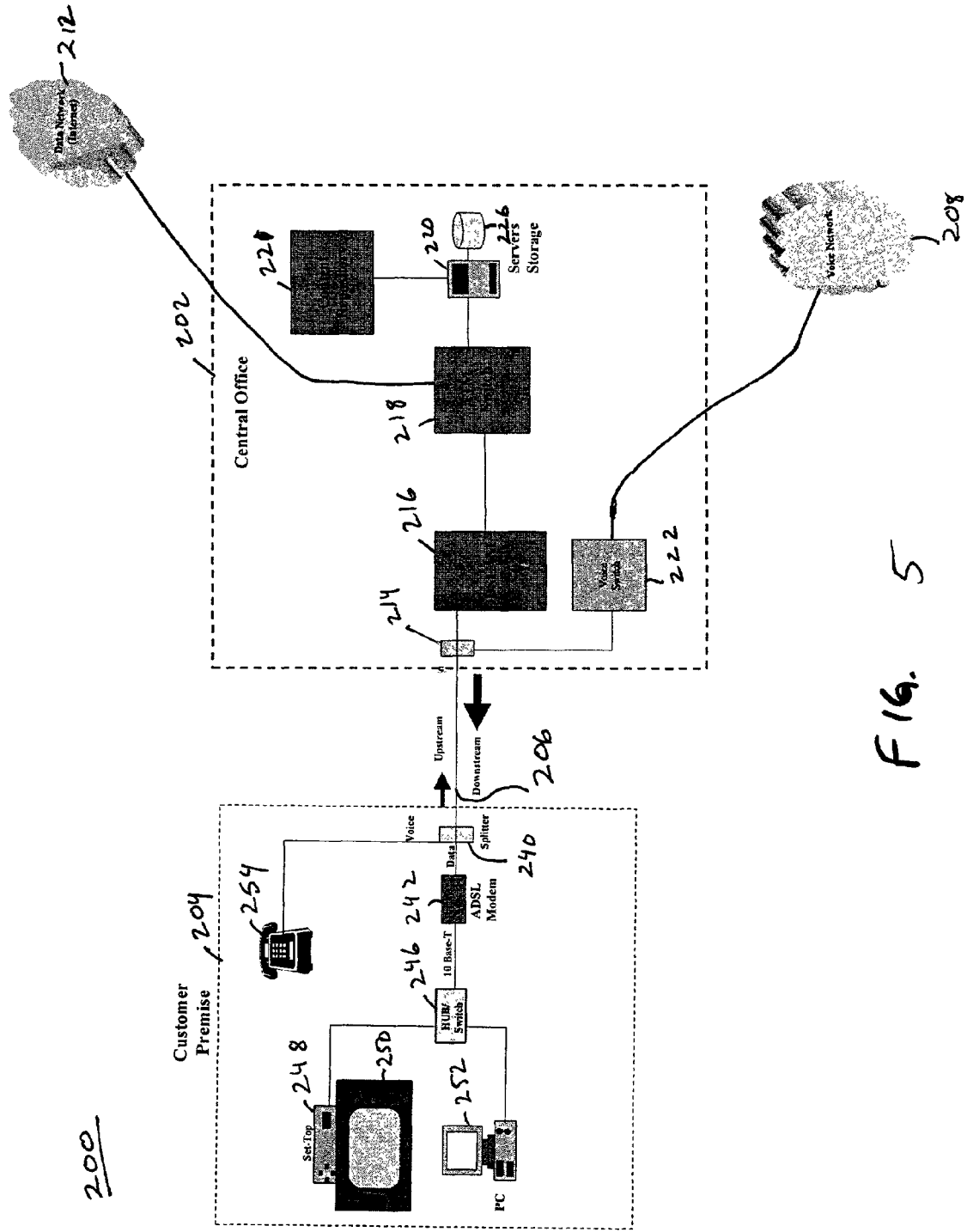
FIG. 5 is a diagram illustrating a DSL system in accordance with an exemplary embodiment of the present invention.

FIG. 5 is a conceptual diagram illustrating a second approach to decomposing content. This approach relies on a pyramidal scheme 110 for decomposing content. Under this scheme, each compressed content file is decomposed into an LQ and a ΔQ that is subdivided into smaller sections:

$$\Delta Q = \sum_{i=1}^{n} q_i \quad (1)$$

The combined compressed content is:

$$\text{Compressed Content} = \sum \left( LQ + \sum_{i=1}^{n} q_i \right) \quad (2)$$

The LQ and $q_i$ portions are created and stored in the repository 22.

Depending of the network bandwidth available, the number n changes. For example, for a bandwidth of 1.5 Mbps, n may be 5 and for a 3 Mbps bandwidth n may be 10. As with the first approach discussed in connection with FIG. 3, the LQ portion is stored in the client 28.

For the 1.5 Mbps network, the $q_1, q_2, q_3, q_4$, and $q_5$ portions are downloaded in real-time. At the client 28, the LQ and $q_i$ portions are re-composed and decoded so that the output content is: $LQ+q_1+q_2+q_3+q_4+q_5$.

For the 3 Mbps network, the $q_1, q_2, \ldots, q_9$, and $q_{10}$ portions are downloaded in real-time. At the client 28, the LQ and $q_i$ portions are re-composed and decoded so that the output content is: $LQ+q_1+q_2 \ldots +q_9+q_{10}$.

FIG. 5 is a diagram illustrating an exemplary digital subscriber line (DSL) system 200 in accordance with an embodiment of the present invention. The example network architecture is capable of streaming video content from a central office (CO) 202 to customer premises. The system 200 includes the CO 202 communicating with a customer premise 204 using an ADSL link 206. Although not shown, the system 200 can support multiple customer premises and ADSL links to the CO 202.

The CO 202 includes a splitter 214, a digital subscriber line access multiplexer (DSLAM) 216, a voice switch 222, an asynchronous transfer mode (ATM) switch 218, a content server 220 and storage device 226, and a content repository 221.

The CO 202 can communicate with a data network 212, such as the Internet, through the ATM switch 218. The voice switch 222 can be a conventional telecommunications switch that permits the CO 202 to communicate with a voice network 208, such as the plain old telephone system (POTS).

The customer premise 204 includes a splitter 240, an ADSL modem 242, an Ethernet hub/switch 246, a set-top box 248, a display device 250, such as a TV, a personal computer (PC) 252, and a telephone 254.

DSL is a high-speed, dedicated, point-to-point network technology for delivering voice, video and data at speeds much faster than the analog modem technology. DSL services are designed for the local loop, or "last mile" copper from a central office (CO) to an end user's business or home. End users closer to the central office can be served with higher bandwidth connections. The technology can deliver higher speed connections up to a range of 18,000 feet (5.5 km) from the CO.

A major advantage of DSL is that it uses the existing copper telephone wires to the customer locations. With 800 million phone lines deployed throughout the world, there is thus little need for new wiring to support DSL services. Many providers are offering a version of the DSL technology that is Asymmetric DSL (ADSL).

Figure 6:
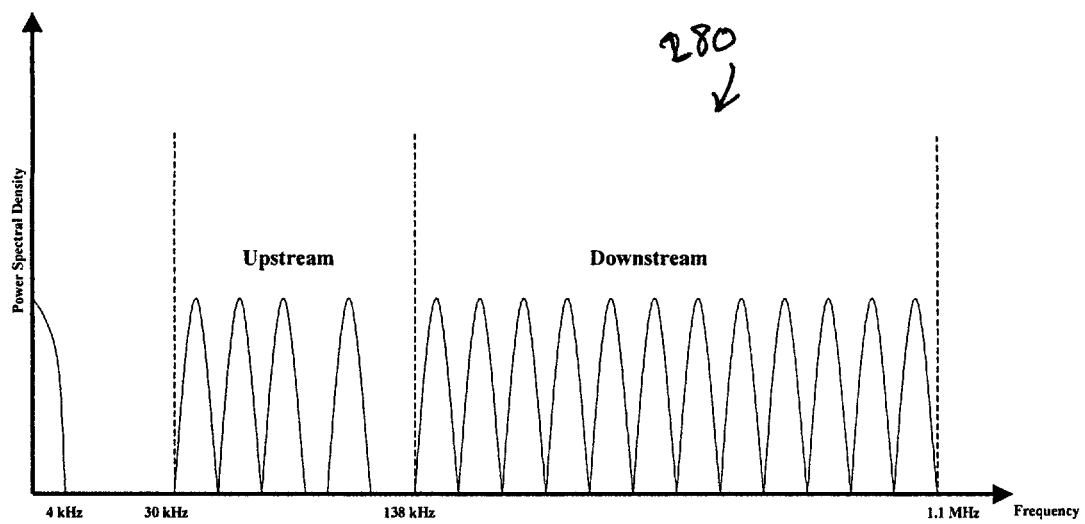
FIG. 6 is a graph illustrating an exemplary ADSL spectrum.

ADSL provides more bandwidth downstream for faster downloads where it is needed, than for uploads. ADSL Full Rate supports downstream speeds up to 8 Mbps, and upstream rates up to 1 Mbps. FIG. 6 is a graph 280 illustrating an exemplary ADSL spectrum. FIG. 6 illustrates how the DMT (Discrete Multi-Tone) line code separates the phone line into three channels: up to 4 kHz channel reserved for voice, a 30 kHz to 138 kHz channel reserved for upstream traffic, and a 138 kHz to 1.1 MHz channel reserved for downstream traffic.

ADSL modems leverage signal processing techniques that insert and extract more digital data onto analog lines beyond the frequencies of normal voice services. Because the high frequency carrier signal can be modified, a larger digital data payload can be carried in the signal over greater distances using standard phone lines.

In order to separate the regular voice service from the ADSL service, the splitters 214, 240 are used at the CO 202 and customer premise 204. When an ADSL transmission is received at the CO 202, the central office POTS splitter 214 sends the voice traffic to the voice switch 222 and the data traffic to the DSLAM 216 and to the data network 212 and repository server 220.

There are two types of DSLAMs usable with the system 200: a CO DSLAM, which is built for high density and concentration, and a remote DSLAM that is in a digital loop carrier (DLC) system in neighborhoods and office parks.

The video content is acquired by the server 220 from the content repository 221. The content repository 221 may be located at the CO 202 or in a different location. In this example, the video server 220 is connected to the ATM switch 218 that is linked to an ADSL DSLAM 216.

In response to customer requests from the set-top box 248, video content is sent to the set-top box 248 from the repository 221, and after recomposing, decompressing and decoding by the set-top box 248, the video is displayed on the TV monitor 250.

Figure 7:
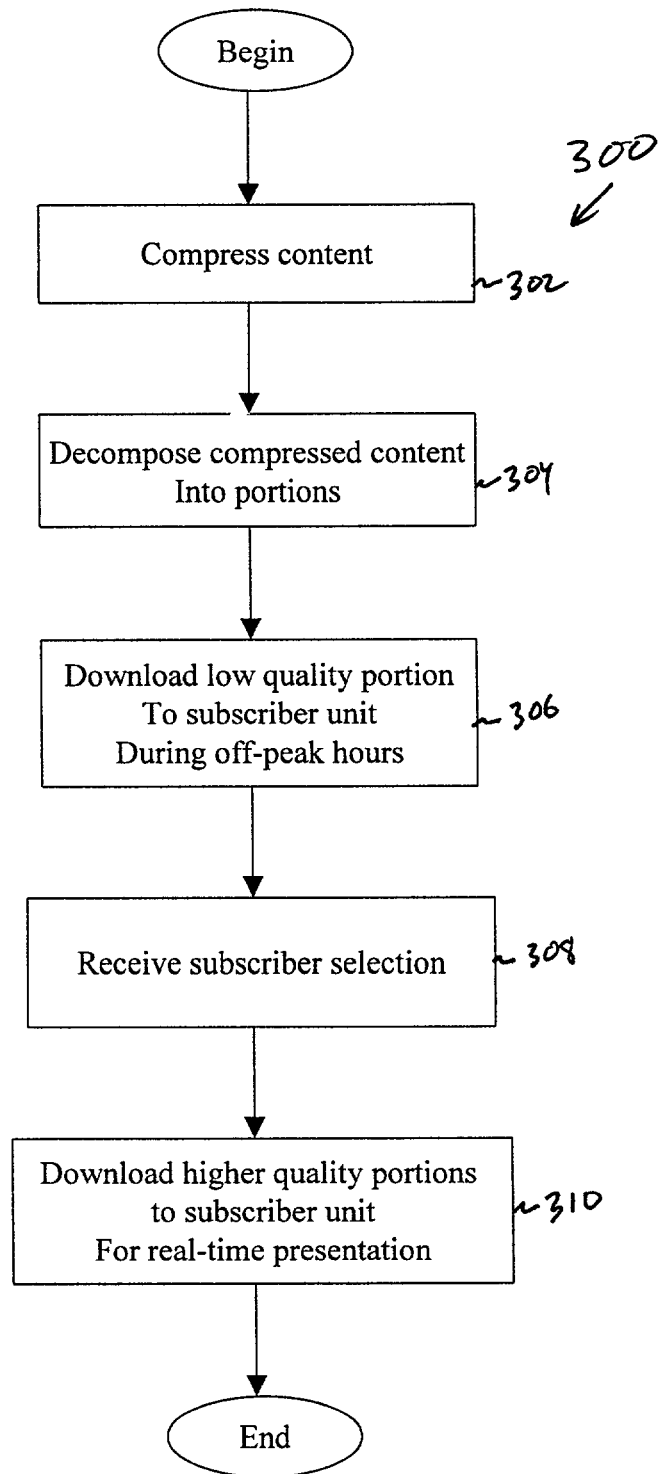
FIG. 7 is a flowchart illustrating operation of the central office shown in FIG. 5.

FIG. 7 is a flowchart 300 illustrating operation of the central office shown in FIG. 5. In step 302, content to be stored in the repository 221 is compressed using a predetermined compression technique. Some of the compression techniques usable with the system 200 are described in further detail in connection with FIGS. 9-14. The compression algorithm can be executed by the server 220 or any other device for generating compressed content.

In step 304, the compressed content files are decomposed into LQ and ΔQ portions. These portions are then stored in the repository 221.

Next, in step 306, one or more LQ portions are downloaded to the set-top box 248. These portions can be downloaded by the server 220 during off-peak hours, when the network usage is low.

In step 308, a subscriber selection from the set-top box 248 is received at the server 220. The subscriber selection can be a message identifying a particular content file. The subscriber selection can be generated by a user interface (not shown) included in the set-top box 248. The user interface can present a menu on the TV monitor 250 that lists content files, such as movies, and permits the subscriber to make selections therefrom.

In response to receiving the subscriber selection, the server 220 retrieves a corresponding ΔQ portion from the content repository 221 and then downloads the ΔQ portion to the set-top box 248 for real-time presentation.

Figure 8:
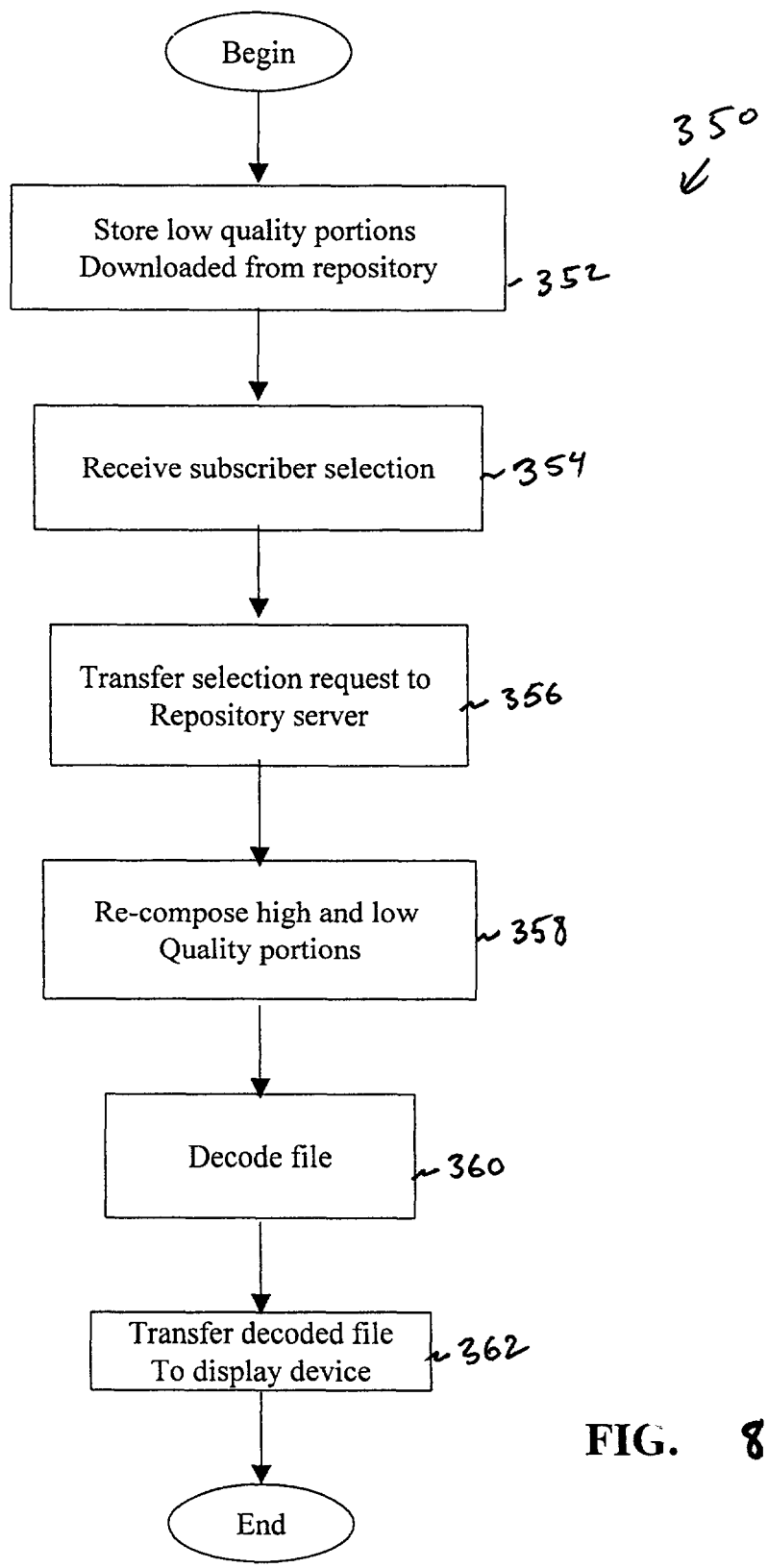
FIG. 8 is a flowchart illustrating operation of the set-top box shown in FIG. 5.

FIG. 8 is a flowchart 350 illustrating operation of the set-top box 248 shown in FIG. 6. In step 352, LQ portions downloaded from the repository 221 are stored locally within the set-top box 248. Next, in step 354, a subscriber selection is received by the set-top box 248. If the selection corresponds to a content file having a locally stored LQ portion, the selection request is then transferred to the server 220. In response to receiving a selection request, the server 220 begins streaming the ΔQ portion to the set-top box 248.

Figure 4:
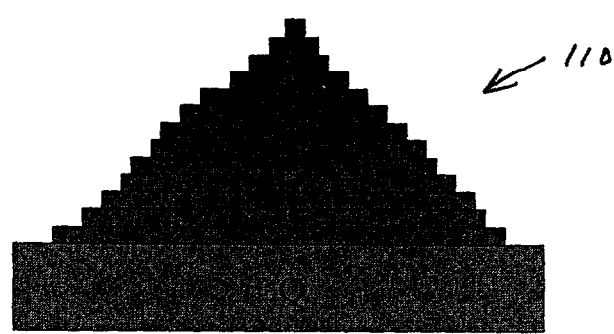
FIG. 4 is a conceptual diagram illustrating a pyramidal scheme for decomposing content.

Upon receiving the ΔQ portion, the set-top box 248 recomposes the LQ and ΔQ portions, as described in connection with FIGS. 2-4 (step 358). In step 360, the set-top box 248 decodes the recomposed content. The decoded content is then transferred to the TV monitor 250 for real-time display (step 362).

In order to create and decompose content transferred by the system 200, the content is compressed using a compression technique. The present invention is not dependent on any particular compression technique, and the following paragraphs describe examples of compression techniques that can be used with the video over ADSL transmission system 200, as well as the system 20 of FIG. 1.

Video content delivered by the system 200 is compressed using a video compression technique. Many conventional video compression techniques can be used to decompose the video into LQ and ΔQ parts. Three examples of compression techniques are described below. These techniques are discrete cosine transform (DCT) based algorithms, subband/wavelets-based algorithms, and vector quantization (VQ) algorithms.

Figure 9:
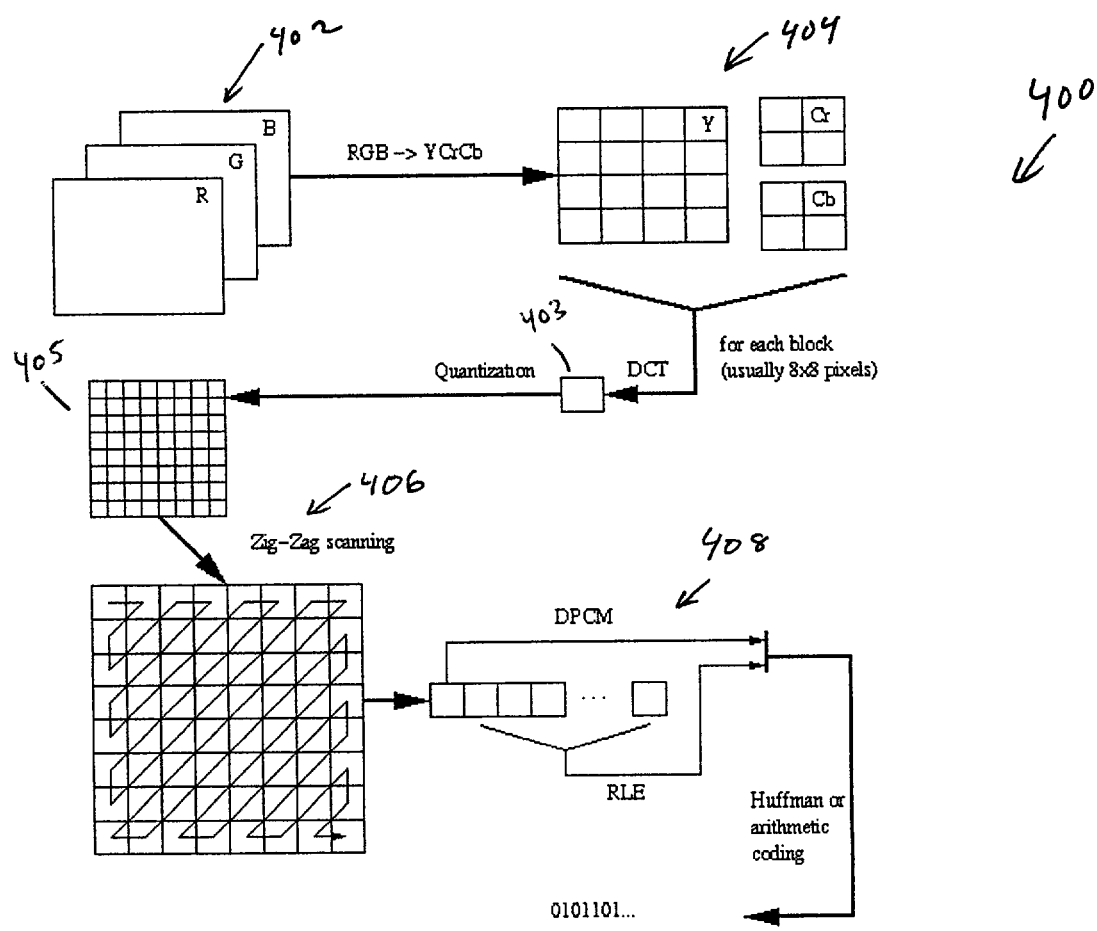
FIG. 9 is a process chart illustrating a DCT algorithm for compressing content.

FIG. 9 is a process chart 400 illustrating a DCT algorithm for compressing content. There are a variety of techniques for compressing still and moving images (videos). One of the most popular compression technologies is transform-based. In a transform-based compression technology, an image is transformed using a transformation matrix, then quantized and transmitted. At the receiver, the data is de-quantized and an inverse transformation is applied to reconstruct the original content. DCT has been one of the most popular transformation techniques used in almost all standards-based compression technologies such as JPEG, MPEG-1, MPEG-2, MPEG-4, H.261, and H.263.

DCT is used on small blocks of pixels, usually 8×8 or 16×16 pixels. In most cases the energy of the video/image signal is concentrated in the lower frequency zone, and the higher frequency coefficients represent information on edges, transitions, and other finer details of the content. It is possible to reconstruct the original content by only a few DCT coefficients from the lower frequency area of the DCT matrix, and by disregarding coefficients in the higher frequency area.

FIG. 9 describes the application of DCT on a still image. The image is first converted from an RGB format 402 into a Luminance (Y) and Chrominance (Cr, Cb) frames 404. The chrominance frames can be sub-sampled because color pixels are highly correlated. The Y and Cr and Cb frames are divided into small blocks of 8×8, 16×16 or 32×32 pixels 405. The DCT is applied on the 8×8-pixel blocks followed by a quantization step 403. Then the DCT coefficients are arranged in a Zigzag manner 406, and higher frequency DCT coefficients are disregarded. DPCM, Run Length Encoding (RLE) and Huffman or arithmetic coding 408 are used before transmitting the bits through a transmission channel. This is the basic structure of JPEG.

For video, because of temporal correlation between frames, a search for a motion vector is performed for each block in the previous frame. If a match is found, only a motion vector is transmitted. For blocks that don't have associated motion vectors, the DCT is computed then quantized and coded using a coding scheme and transmitted to the decoder. There are many variants of DCT-based encoding and all major ITU and ISO standards such as JPEG, MPEG and H.26x are all based on block-based DCT compression technique.

To apply a video DCT-based approach to this invention, all motion vectors along with the low frequency DCT coefficients are sent to the client and stored in the local storage device. This information will be the LQ part of the video and represent a relatively lower quality version of the video. Then after the user has made the selection of a video, more DCT coefficients corresponding to the higher spatial frequency zone in each block will be sent to the client as the ΔQ portion of the video. In case of network congestion the lower quality version of the video will be displayed until the congestion is cleared.

When dealing with moving images or video another important technique to reduce the bit rate that can be used along with DCT compression is motion compensation. The images are converted to YCrCb space, and the two chrominance channels (Cr and Cb) are decimated further to reduce the pixel count. In natural images, higher compression in the chrominance space does not results in noticeable visual artifacts and this is the reason the chrominance signals are down-sampled.

The first step in compressing moving images is to predict motion from frame to frame in the temporal direction, and then to use DCT to organize the redundancy in the spatial directions. The DCT is applied on image blocks of 8×8 pixels in size, and the motion prediction is done in the luminance (Y) channel on 16×16-pixel blocks. In other words, given the 16×16 block in the current frame that is being compressed, a search for a close match to that block in a previous or future frame (there are backward prediction modes where later frames are sent first to allow interpolating between frames) is performed. The DCT coefficients (of either the actual data, or the difference between this block and the close match) are "quantized", which means that higher frequency DCT coefficients are disregarded. During the quantization process, many of the DCT coefficients will end up being zero. The quantization can change for every "macroblock" (a macroblock is 16×16 of Y and the corresponding 8×8's in both U and V). The results of all of this, which include the DCT coefficients, the motion vectors, and the quantization parameters is Huffman coded using fixed tables. The DCT coefficients have a special Huffman table that is "two-dimensional" in that one code specifies a run-length of zeros and the non-zero value that ended the run. Also, the motion vectors and the DC DCT components are DPCM (subtracted from the last one) coded. The above describes the basic structure of MPEG-1 and MPEG-2 compression standards.

Figures 10, 11:
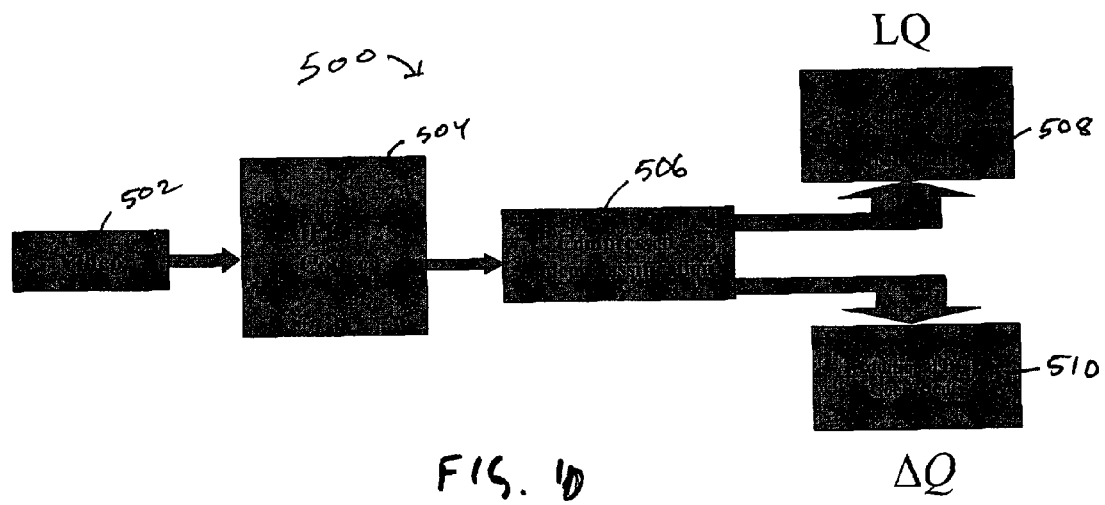
FIG. 10 is a process diagram illustrating the decomposition of content using an MPEG-2 compression algorithm.
FIG. 11 is an exemplary DCT coefficient map.

Standard MPEG-2 compression technology can be used in an efficient manner to compress the content and decompose the compressed data into LQ and ΔQ partitioning. FIG. 10 is a process diagram 500 illustrating the decomposition of video content using an MPEG-2 compression algorithm. The video file 502 is provided to an MPEG-2 codec 504 to generate a compressed video output. The compressed video is then classified 506, or decomposed, into LQ and ΔQ parts. The LQ part 508 of the compressed content can contain all motion vectors and low frequency DCT coefficients. The ΔQ portion 510 can include higher frequency DCT coefficients. The number of DCT coefficient included in the ΔQ portion 510 depends on the targeted type of ADSL connection and the minimum bandwidth available.

In the system 200, the process 500 can be implemented in software executed by the server 220. The server 220 can be a PC running a conventional operating system and including networking cards and software for interfacing to the ATM switch 218 and repository 221.

FIG. 11 is an exemplary DCT coefficient map 450. The DCT block corresponds to an image block of 8×8 pixels. In this example, LQ for each frame of video consists of all motion vectors and the DCT coefficients from 1-10. The LQ part of the content is sent ahead of time and the different ΔQs are sent in real-time to ADSL connections with different bandwidth. For example, an ADSL connection with a bandwidth of 1.5 Mbps would receive the DCT coefficients 1-10 and additional DCT coefficients 11-15. Another ADSL connection with a bandwidth of 3 Mbps would receive DCT coefficients 1-15, as well as additional DCT coefficients 16-21. An ADSL connection with 6 Mbps of bandwidth would receive DCT coefficients 1-36.

With MPEG-2, the set-top box 248 performs the function of reorganizing LQ and ΔQ first, and then a standard MPEG-2 decoder can be used to decompress the video and send it to the TV monitor 250. Reorganizing the data can be performed either in software or hardware.

Another compression technique that can be used in the systems 20 and 20 is sub-band coding and wavelets. With conventional sub-band coding and wavelet techniques, a signal spectrum is partitioned into several frequency bands. Each band is encoded and transmitted separately. The wavelet approach is a form of sub-band coding, and hence, for brevity, only sub-band coding is discussed in detail below.

In sub-band coding, an image is first filtered to create a set of images, each of which contains a limited range of spatial frequencies. These images are called the sub-bands. Since each sub-band has a reduced bandwidth compared to the original full-band image, they may be down sampled. This process of filtering and sub-sampling is termed the analysis stage. The sub-bands are then encoded using one or more coding schemes. Different bit rates and different compression techniques can be used to adaptively and optimally encode the video.

Reconstruction at the client is achieved by up sampling the decoded sub-bands, applying the appropriate filters, and adding the reconstructed sub-bands together. This stage of the process is called synthesis stage.

The application of sub-band/wavelets to this invention is to transmit the lower spatial frequency sub-bands first as the LQ part of the video, and then after the user has made a selection, to send higher spatial frequency sub-bands as the ΔQ part of the video.

Figure 12:
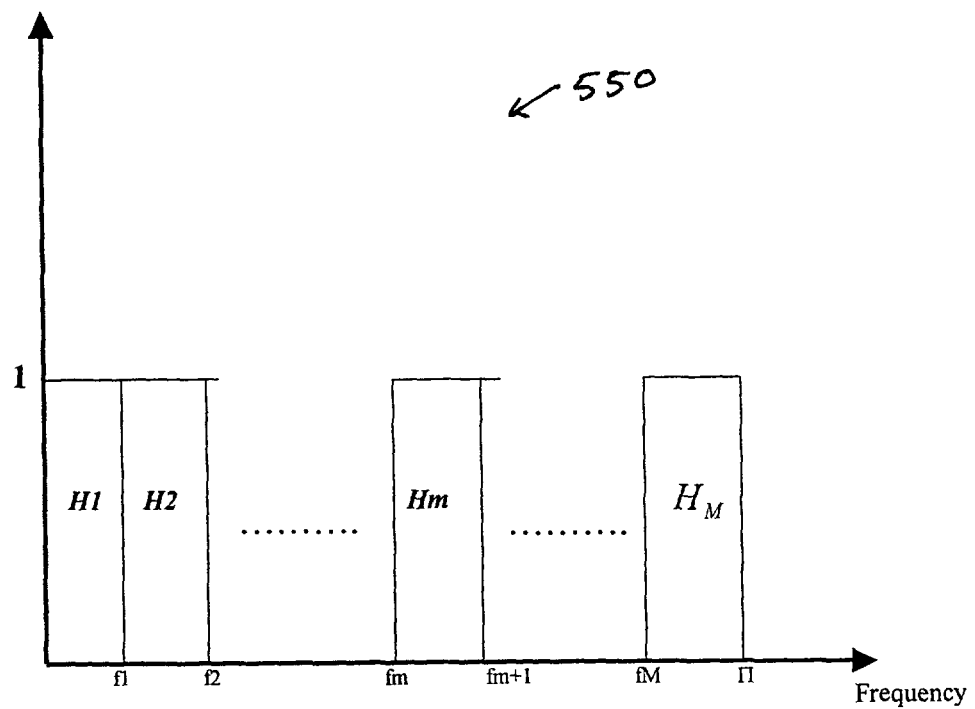
FIG. 12 is a graph showing an exemplary signal spectrum for a sub-band coding algorithm.

FIG. 12 is a graph 550 showing an exemplary signal spectrum for a sub-band coding algorithm. FIG. 12 shows the transfer function for a typical sub-band filter. An ideal sub-band filter is made of a bank of bandpass filters, which are contiguous in frequency, zero attenuation in the pass-band and infinite attenuation in stop band. When applying the bank of filters to an image or video signal, a series of filtered images are obtained. The bandpass filters reduce the bandwidth of each one of these filtered images. According to Nyquist criteria, the smaller size images obtained from this phase of filtering can be downsampled at a lower rate. In sub-band coding the combination of bandpass filtering and downsampling is called decimation. The inverse process that allows reconstructing the original signal is called Interpolation.

Figure 13:
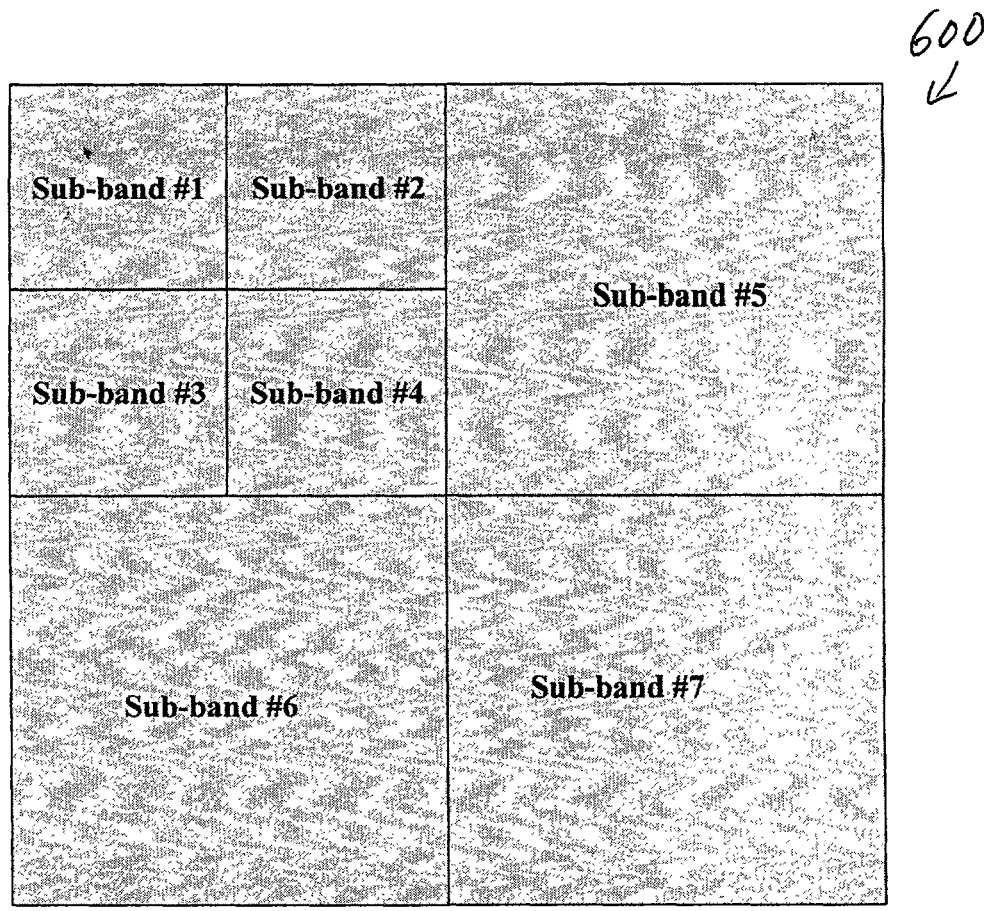
FIG. 13 is a decomposition map of an image frame that has been decomposed into seven sub-bands.

FIG. 13 is a conceptual decomposition map 600 of an image frame that has been decomposed into seven sub-bands. In FIG. 13, sub-bands 1, 2, 3 and 4 represent most of the information contained in the image (lower spatial frequency information). The remaining sub-bands represent sharp transition, edges of object and other higher spatial frequency information. The lower sub-bands can be included in the LQ portion of a decompose file, while the higher sub-bands can make up the ΔQ portion.

Sub-band decomposition is well suited to the video over ADSL transmission system 200. In one embodiment of the system 200, sub-bands 1-2 of FIG. 13 can be regarded as the core information (LQ) for each frame and can be downloaded in off-peak hours to the set-top box 248. The remaining bands are part of ΔQ and can selectively be sent to the set top box 248 on demand, based on he ADSL bandwidth available.

Commercially-available encoder and decoder chip sets for sub-band coding can be included in the CO 202 and set-top box 248, respectively, to implement a sub-band coding approach. In order to reconstruct the original content at the set-top box 248, the LQ part of the content that is already downloaded in the set-top box 248 is combined with the ΔQ that corresponds to the higher spatial frequency sub-bands and is decoded to reproduce the original content.

Figure 14:
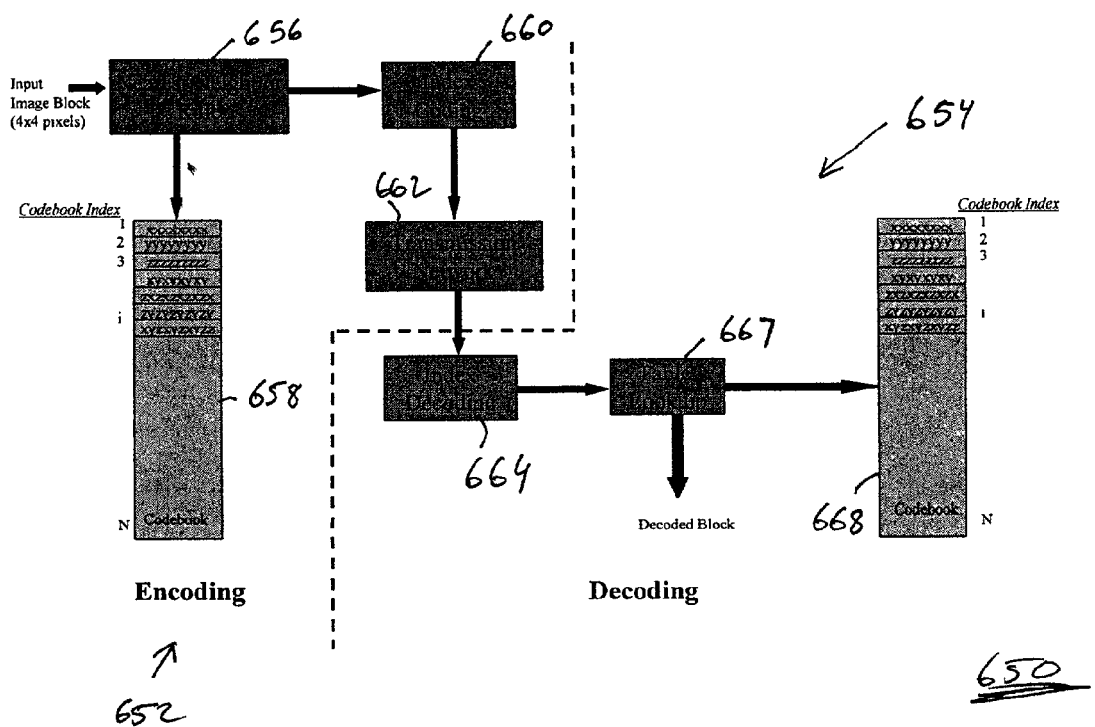
FIG. 14 is a block diagram illustrating vector quantization processes for encoding and decoding content.

FIG. 14 is a block diagram 650 illustrating vector quantization (VQ) processes for encoding and decoding content. The encoding process 652 can take place at the CO 202 to generate compressed, decomposed content that is stored in the repository 221. The decoding process 654 takes place at the set-top box 248 to re-compose the content for presentation.

Digital signals can be compressed by assigning shorter code words to more probable signals and that the maximum achievable compression could be determined from a statistical description of the signal. Coding vectors or groups of symbols (pixels in images, speech samples in voice, etc.) is more efficient than coding individual symbols or samples. Vector quantization is based on these principles and has been used in speech, image, and video coding.

A vector quantizer Q of dimension k and size N is a mapping of a vector in a K dimensional Euclidean space $R^k$ into a finite set "C" containing N outputs or reproduction points called "codevectors" or "codewords".

$$Q: R^k \to C \quad (3)$$

Where $C=(Y_1, Y_2, Y_3, \ldots Y_i, \ldots, Y_n)$, and $Y_i$ are elements of $R^k$ for each $i=\{1, 2, 3, \ldots, N\}$.

The set "C" is called the codebook 658.

In video compression, VQ is used along with motion compensation to reduce the bit rate. Typically VQ is applied on a single video frame that is divided into small blocks of 4×4 pixels. For each block of 4×4 pixels, a search is performed in a codebook to obtain the closest match possible. The can be accomplished using a nearest neighbor rule 656. The codebook 658 consists of different patterns of 4×4-pixel blocks with different colors and textures. Codebooks are formed using clustering algorithms and that are applied on a large set of example content.

Each entry in the codebook is assigned an index. After finding the closest match to a block, the index 660 corresponding to the matching block from the codebook 658 is transmitted to the decoder 654 through a transmission network 662. The decoder 654 has a copy 668 of the same codebook 658, and after decoding 664 the index, it performs a table look up 667 in the codebook 668 and retrieves the matching block that represents the original content.

The larger the codebook the higher is the video quality. However, larger codebooks result also in higher bit rates.

There are different ways that VQ can be included in the systems 20 and 200. One approach is to decompose video content information into Luminance (Y) and motion vectors, and Chrominance (Cr, Cb). The LQ would be the combination of Y and motion vectors, and ΔQ would consist of the chrominance information. The approach can use different codebooks for Y and Cr and Cb. Alternative approaches rely on the segmentation of the codebook in such a way that a low quality version of the content is created as LQ and residual information is stored as ΔQ.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

The invention claimed is:

1. A method of downloading video content representing a subscriber program to a subscriber terminal over an asymmetric digital subscriber line, comprising:

Decomposing, at a server, using a pyramid compression technique, a video content into a plurality of video quality portions during compression of the video content, wherein the compression of the video content uses one of a sub-band technique and a vector quantization technique, wherein the decomposing produces a low-quality video portion and a plurality of incrementally higher quality video portions of the video content, such that each combination of said low-quality video portion and a combination of one or more of said plurality of incrementally higher quality video portions provides a different bit rate of the video content corresponding to a different video quality level of the video content having a higher video quality than said low-quality video portion, wherein said low-quality video portion comprises a complete copy of the video content;

Downloading from the server, prior to receiving a request for the video content from the subscriber terminal, said low-quality video portion comprising said complete copy of the video content, to the subscriber terminal via the asymmetrical digital subscriber line during off-peak hours for storage locally at the subscriber terminal;

receiving from a user at the subscriber terminal, a selection request for the video content made subsequent to downloading and storing of said low-quality video portion comprising said complete copy at the subscriber terminal;

determining, by the server, in response to receiving the selection request for the video content from the subscriber terminal, a bandwidth of the asymmetrical digital subscriber line assigned to the subscriber terminal;

determining, by the server, an optimized combination of one or more of said plurality of incrementally higher video quality portions for the determined bandwidth of the asymmetrical digital subscriber line to the subscriber terminal;

retrieving, by the server, said optimized combination of one or more of said plurality of incrementally higher quality video portions;

downloading from the server, said optimized combination of one or more of said plurality of incrementally higher quality video portions retrieved by the server, to the subscriber terminal via the asymmetrical digital subscriber line in real time; and recombining at the subscriber terminal, said locally stored low-quality video portion comprising said complete copy of the video content with said optimized combination of one or more of said plurality of incrementally higher video quality portions downloading from the server in real time, for presentation of the video content, wherein the recombining step provides a higher video quality of the video content at a bit rate exceeding the assigned bandwidth of the asymmetrical digital subscriber line to the subscriber terminal.

2. The method of claim 1, wherein each combination of one or more of said plurality of incrementally higher video quality portions is predetermined by the server to be optimized for a different bandwidth, wherein the compression further comprises sub-band coding and wherein said low-quality video portion further comprises lower spatial frequency sub-bands than said plurality of incrementally higher video quality portions of the video content.

3. The method of claim 1, further comprising:
determining a service level assigned to the subscriber terminal,
wherein the step of determining said optimized combination further comprises determining said optimized combination for the service level assigned to the subscriber terminal.

4. The method of claim 2, wherein said plurality of video quality portions are organized in a pyramidal scheme.

5. The method of claim 1, further comprising:
recomposing said low-quality video portion and said optimized combination of one or more of said plurality of incrementally higher video quality portions representing the subscriber program at the subscriber terminal for presenting the video content to the user.

6. A system for providing video content representing a program over an asymmetric digital subscriber line, comprising:
a networked subscriber device;
a server processor in data communication with a non-transitory computer readable medium, the computer readable medium containing computer program instructions that when executed by a computer provide video content to the networked subscriber device, the computer program instructions comprising:
instructions to decompose a video content into a plurality of video quality portions during compression of the video content using a pyramid compression technique, wherein the compression of the video content uses one of a sub-band technique and a vector quantization technique, wherein the decomposing produces a low-quality video portion and a plurality of incrementally higher quality video portions of the video content, such that each combination of said low-quality video portion and a combination of one or more of said plurality of incrementally higher quality video portions provides a different bit rate of the video content corresponding to a different video quality level of the video content having a higher video quality than said low-quality video portion, wherein said low-quality video portion comprises a complete copy of the video content;
instructions to download, prior to receiving a request for the video content from the networked subscriber device, said low-quality video portion, comprising said complete copy of the video content, to the networked subscriber device via asymmetrical digital subscriber line during off-peak hours for storage locally at the networked subscriber device;
instructions to receive from the networked subscriber device, a selection request for the video content made by a user subsequent to download and storage of said low-quality video portion comprising said complete copy at the networked subscriber device;

instructions to determine a bandwidth of the asymmetrical digital subscriber line assigned to the networked subscriber device, in response to receiving the selection request for the video content from the networked subscriber device;

instructions to determine an optimized combination of one or more of said plurality of incrementally higher video quality portions for the determined bandwidth of the asymmetrical digital subscriber line to the networked subscriber device;

instructions to retrieve said optimized combination of one or more of said plurality of incrementally higher quality video portions;

instructions to download, said optimized combination of one or more of said plurality of incrementally higher quality video portions that is retrieved, to the networked subscriber device via the asymmetrical digital subscriber line in real time; and at the networked subscriber device, recombining said locally stored low-quality video portion comprising said complete copy of the video content with said optimized combination of one or more of said plurality of incrementally higher video quality portions downloading in real time, for presentation of the video content, wherein the recombining provides a higher video quality of the video content at a bit rate exceeding the bandwidth of the asymmetrical digital subscriber line assigned to the networked subscriber device.

7. The system of claim 6, wherein the instructions to decompose further comprise instructions to decompose the compressed video content using a pyramidal scheme.

8. The system of claim 6, the computer program instructions further comprising:

instructions for determining a service level assigned to the networked subscriber device;

wherein the instructions to determine said optimized combination further includes instructions to determine said optimized combination for the service level assigned to the network subscriber device.

9. A non-transitory computer-readable storage medium containing a set of instructions that when executed by a computer provide video content representing a program to a subscriber terminal over an asymmetrical digital subscriber line, the set of instructions comprising:

instructions to decompose a video content into a plurality of video quality portions during compression of the video content using a pyramid compression technique, wherein the compression of the video content uses one of a sub-band technique and a vector quantization technique, wherein the decomposing produces a low-quality video portion and a plurality of incrementally higher quality video portions of the video content, such that each combination of said low-quality video portion and a combination of one or more of said plurality of incrementally higher quality video portions provides a different bit rate of the video content corresponding to a different video quality level of the video content having a higher video quality than said low-quality video portion, wherein said low-quality video portion comprises a complete copy of the video content;

instructions to download, prior to receiving a request for the video content from the subscriber terminal, said low-quality video portion, comprising said complete copy of the video content, to the subscriber terminal via asymmetrical digital subscriber line during off-peak hours for storage locally at the subscriber terminal;

instructions to receive from the subscriber terminal, a selection request for the video content made by a user subsequent to downloading and storing said low-quality portion comprising said complete copy at the subscriber terminal;

instructions to determine a bandwidth of the asymmetrical digital subscriber line assigned to the subscriber terminal, in response to receiving the selection request for the video content from the subscriber terminal;

instructions to determine an optimized combination of one or more of said plurality of incrementally higher video quality portions for the determined bandwidth of the asymmetrical digital subscriber line to the subscriber terminal;

instructions to retrieve said optimized combination of one or more of said plurality of incrementally higher quality video portions for download to the subscriber terminal in real time;

instructions to download, said optimized combination of one or more of said plurality of incrementally higher quality video portions that is retrieved, to the subscriber terminal via the asymmetrical digital subscriber line in real time, allowing the subscriber terminal to recombine said low-quality video portion comprising said complete copy of the video content, locally stored therein, with said optimized combination of one or more of said plurality of incrementally higher video quality portions downloading in real time, wherein the recombining at the subscriber terminal provides a higher video quality of the video content at a bit rate exceeding the bandwidth of the asymmetrical digital subscriber line assigned to the subscriber terminal.

* * * * *